(12) United States Patent
Williams

(10) Patent No.: US 11,949,205 B2
(45) Date of Patent: *Apr. 2, 2024

(54) OPTICAL AMPLIFIER MODULES

(71) Applicant: II-VI Delaware, Inc., Wilmington, DE (US)

(72) Inventor: Martin R. Williams, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,750

(22) Filed: Jan. 9, 2023

(65) Prior Publication Data

US 2023/0163555 A1   May 25, 2023

Related U.S. Application Data

(63) Continuation of application No. 17/119,425, filed on Dec. 11, 2020, now Pat. No. 11,575,241.

(51) Int. Cl.
*H01S 3/30* (2006.01)
*H01S 3/067* (2006.01)
(Continued)

(52) U.S. Cl.
CPC ...... *H01S 3/06787* (2013.01); *H01S 3/06758* (2013.01); *H01S 3/094003* (2013.01);
(Continued)

(58) Field of Classification Search
CPC ............ H01S 3/06787; H01S 3/06758; H01S 3/094003; H01S 3/094042; H01S 3/10015; H01S 3/06754; H01S 3/06762
See application file for complete search history.

(56) References Cited

U.S. PATENT DOCUMENTS

| 654,513 A | 7/1900 | Brooks |
| 5,668,658 A | 9/1997 | Hamada |

(Continued)

FOREIGN PATENT DOCUMENTS

WO   2007132268 A2   11/2007

OTHER PUBLICATIONS

LICOMM, "QFSP-EDFA Pluggable EDFA Series", Undated, downloaded from https://www.licomm.com/qoa, Sep. 20, 2022.
(Continued)

*Primary Examiner* — Kinam Park
(74) *Attorney, Agent, or Firm* — Blank Rome LLP

(57) ABSTRACT

The present disclosure generally relates optical amplifier modules. In one form for example, an optical amplifier module includes a booster optical amplifier configured to increase optical power of a first optical signal. The module also includes a preamp optical amplifier configured to increase optical power of a second optical signal and a pump laser optically coupled to the booster optical amplifier and the preamp optical amplifier. The pump laser is configured to provide a booster power to the booster optical amplifier and a preamp power to the preamp optical amplifier, the preamp power is effective to induce a gain in optical power to provide a target optical power of the second optical signal from the preamp optical amplifier, and the booster power is dependent on the preamp power.

16 Claims, 7 Drawing Sheets

(51) Int. Cl.
*H01S 3/094* (2006.01)
*H01S 3/10* (2006.01)

(52) U.S. Cl.
CPC .... *H01S 3/094042* (2013.01); *H01S 3/10015* (2013.01); *H01S 3/06754* (2013.01); *H01S 3/06762* (2013.01); *H01S 2301/04* (2013.01)

(56) References Cited

U.S. PATENT DOCUMENTS

| | | | |
|---|---|---|---|
| 6,075,633 | A | 6/2000 | Deguchi et al. |
| 6,411,407 | B1 | 6/2002 | Maxham |
| 6,486,984 | B1 | 11/2002 | Baney et al. |
| 6,519,080 | B2 | 2/2003 | Vavassori et al. |
| 6,731,428 | B2 | 5/2004 | Gehlot |
| 6,738,584 | B1 | 5/2004 | Tsuda et al. |
| 6,798,563 | B2 | 9/2004 | Mailhot et al. |
| 6,850,360 | B1 | 2/2005 | Chen et al. |
| 7,031,606 | B2 | 4/2006 | Liu et al. |
| 7,202,995 | B2 | 4/2007 | Fishman et al. |
| 7,317,570 | B2 | 1/2008 | Mcclean et al. |
| 9,077,448 | B2 | 7/2015 | Hathorn et al. |
| 9,485,554 | B1 | 11/2016 | Kim et al. |
| 9,544,050 | B2 | 1/2017 | Cavaliere et al. |
| 9,780,881 | B1 | 10/2017 | Rope et al. |
| 9,793,667 | B1 | 10/2017 | Park et al. |
| 11,177,886 | B2* | 11/2021 | Williams ............... H01S 3/1312 |
| 11,575,241 | B2* | 2/2023 | Williams ............. H04B 10/293 |
| 2002/0021473 | A1 | 2/2002 | Kasahara et al. |
| 2003/0035184 | A1 | 2/2003 | Deguchi et al. |
| 2003/0123133 | A1 | 7/2003 | Flannery et al. |
| 2003/0223747 | A1 | 12/2003 | Olier et al. |
| 2004/0208569 | A1 | 10/2004 | Nabeyama et al. |
| 2007/0297044 | A1 | 12/2007 | Qiao et al. |
| 2009/0041457 | A1* | 2/2009 | Maki ................... H04J 14/0204 398/45 |
| 2009/0175626 | A1* | 7/2009 | Yang ..................... H04B 10/40 359/333 |
| 2009/0317078 | A1 | 12/2009 | Fukashiro et al. |
| 2014/0056593 | A1 | 2/2014 | Deandrea et al. |
| 2014/0240702 | A1* | 8/2014 | Xu ........................ G02B 21/06 359/385 |
| 2014/0376918 | A1* | 12/2014 | Boduch ............ H04L 25/03006 398/83 |
| 2015/0200851 | A1 | 7/2015 | Berman |
| 2017/0343740 | A1 | 11/2017 | Nguyen |
| 2018/0188465 | A1 | 7/2018 | Zer et al. |
| 2019/0182985 | A1 | 6/2019 | Gaviola et al. |
| 2019/0190604 | A1 | 6/2019 | Kilper et al. |
| 2020/0131900 | A1* | 4/2020 | Leblanc ............... E21B 49/00 |

OTHER PUBLICATIONS

Sarkar, Chittajit, "Optical Supervisory Channel Implementation", International Journal of Scientific & Egnineering Research, Nov. 2012, vol. 3, issue 11, pp. 1-3.

* cited by examiner

OPTICAL AMPLIFIER MODULES

This application is a Continuation of U.S. patent application Ser. No. 17/119,425, filed Dec. 11, 2020, the entire contents of which are hereby incorporated by reference herein.

FIELD

The present disclosure generally relates to optical amplifier modules, including for example erbium-doped fiber amplifiers (EDFAs). More particularly, but not exclusively, the present disclosure relates to controlling power of different optical signals with a common pump laser or source in an optical amplifier module.

BACKGROUND

Unless otherwise indicated herein, the materials described herein are not prior art to the claims in the present application and are not admitted to be prior art by inclusion in this section.

Some datacenters include routers, switches, or other transmission chassis configured to receive multiple communication modules that convert data between the optical and electrical domains, with optical signals generally being used for transmission between switches and routers and electrical signals generally being used internally on the switches and routers. Optical loss between two interconnected routers and switches may be significant enough that optical amplifiers may be deployed before, after or both before and after fiber spans to compensate the optical loss.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one embodiment, an optical amplifier module includes a booster optical amplifier configured to increase optical power of a first optical signal, a preamp optical amplifier configured to increase optical power of a second optical signal, and a pump laser optically coupled to the booster optical amplifier and the preamp optical amplifier. The pump laser is configured to provide a booster power to the booster optical amplifier and a preamp power to the preamp optical amplifier. The preamp power is effective to induce a gain in optical power to provide a target optical power of the second optical signal from the preamp optical amplifier, and the booster power is dependent on the preamp power.

In another embodiment, an optical amplifier module includes a booster optical amplifier configured to increase optical power of a first optical signal, a preamp optical amplifier configured to increase optical power of a second optical signal, and a pump laser optically coupled to the booster optical amplifier and the preamp optical amplifier. The pump laser is configured to provide a power output to increase optical power of the first optical signal and the second optical signal. The preamp optical amplifier is configured to receive, from the power output, a first amount of power effective to induce a gain in optical power to provide a targeted optical power of the second optical signal from the preamp optical amplifier. The booster optical amplifier is configured to receive, from the power output, a second amount of power corresponding to a difference between the power output and the first amount of power.

In still another embodiment, a method includes determining an optical power gain to impart to a first optical signal by a first preamp optical amplifier to achieve a target optical power value of the first optical signal; providing from a first optical pump laser a first power level to the first preamp optical amplifier effective to impart the determined optical power gain to the first optical signal; and providing from the first optical pump laser to a first booster optical amplifier a second power level dependent on the first power level as provided to the first preamp optical amplifier, the first booster optical amplifier configured to increase optical power of a second optical signal.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein include a pluggable bidirectional optical amplifier module (hereinafter "pluggable amplifier") for efficient datacenter interconnection. The pluggable amplifier may be optically bidirectional, e.g., it may provide optical amplification in each of two opposing transmission directions. The pluggable amplifier may have attributes such as a mechanical form factor to plug in directly into coherent transceiver cages/slots on routers, switches, or other transmission chassis used in a datacenter.

The pluggable amplifier may include a preamp optical amplifier and a booster optical amplifier, each of which may include an erbium-doped fiber amplifier (EDFA). Each of the preamp and booster optical amplifiers may use an operational wavelength range in an optical spectrum of the EDFA that has a relatively flat gain spectrum. As such, expensive and space inefficient gain flattening filter (GFFs) may be omitted from the pluggable amplifier.

In some embodiments, the pluggable amplifier may have a host interface that supports or is adapted from a Common Management Interface Specific (CMIS) Rev 2.0 (or other revisions). The host interface may implement register mapping on a serial interface common to transceiver shelves for digital diagnostics and management purposes.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
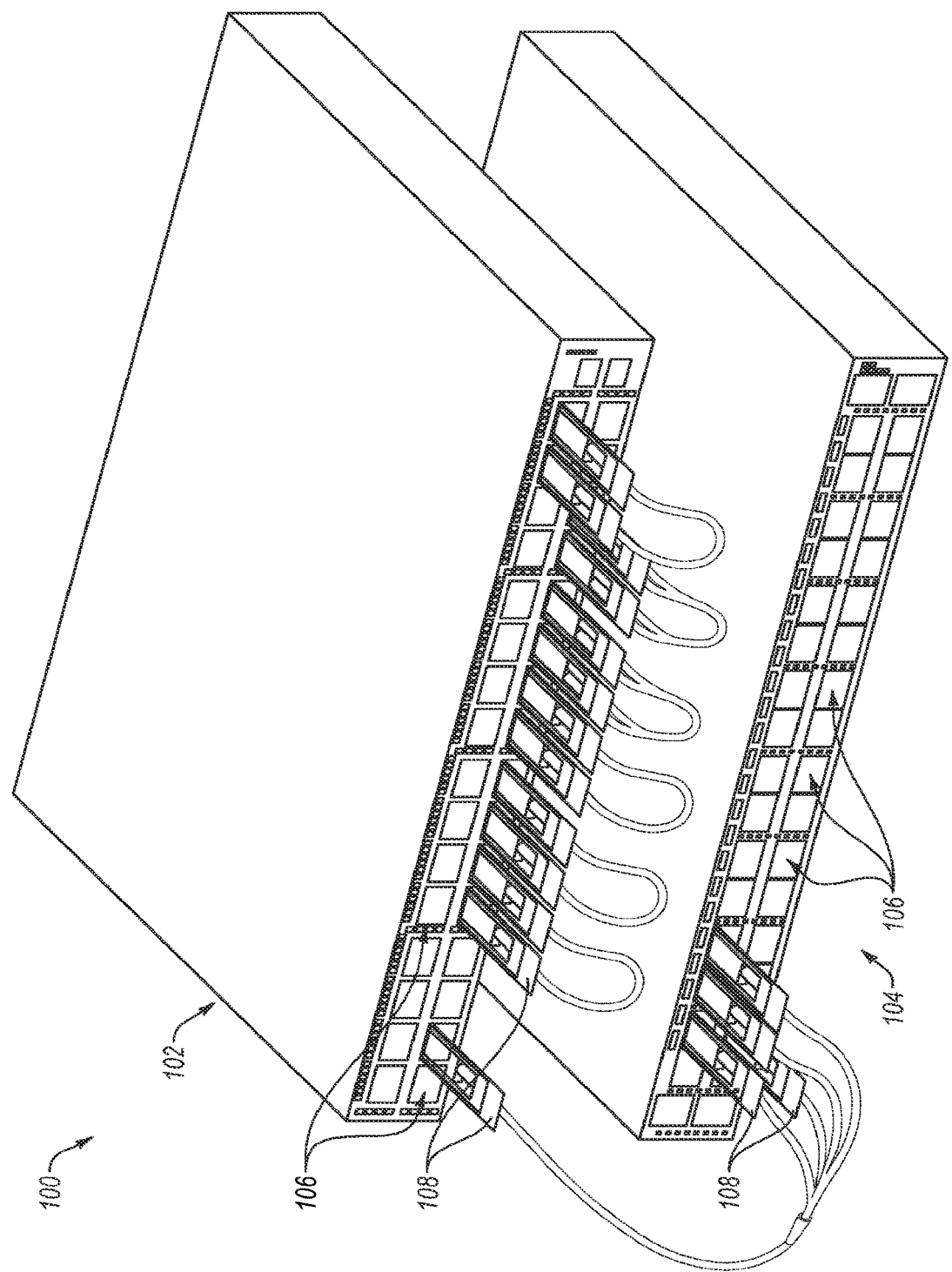
FIG. 1 illustrates an example operating environment in which some embodiments described herein may be implemented.

FIG. 1 illustrates an example operating environment 100 in which some embodiments described herein may be implemented. The environment 100 includes a datacenter switch fabric made up of one or one or more interconnected switches or routers. FIG. 1 specifically illustrates two switches 102, 104 optically interconnected to each other where the switch 102 has various intra-switch optical connections as well.

Each of the switches 102, 104 includes multiple cages or slots 106 to receive multiple pluggable communication modules (hereinafter "communication modules"), such as an optoelectronic transceiver or transponder module. In particular, each cage or slot 106 is configured to receive any of the communications modules 108. Only some of the cages or slots 106 and some of the communications modules 108 are labeled in FIG. 1 for simplicity.

Each of the switches 102, 104 specifically includes 32 cages or slots 106 as illustrated, although there may be more or fewer cages or slots 106 in other embodiments. Each cage or slot 106 is configured to receive an OSFP-compliant communication module 108 in the example of FIG. 1. An OSFP-compliant communication module is a communication module that is compliant with the OSFP multisource agreement (MSA). In other embodiments, the communication modules 108 may be compliant with other communication module MSAs, such as the QSFP56-DD MSA, the CFP8 MSA, or other MSA. All of the cages or slots 106 may have the same form factor, e.g., may conform to the same MSA. The cages or slots 106 and the communication modules 108 generally conform to the same MSA.

In some embodiments, a pluggable bidirectional optical amplifier module (hereinafter "pluggable amplifier") may have a same form factor as the communication modules 108 and the cages or slots 106. Accordingly, one or more of the pluggable amplifiers as described herein may be plugged into any of the cages or slots 106 of the switches 102, 104. One or more of the pluggable amplifiers as described herein may also be implemented in a dedicated chassis with amplifier line cards plugged in, or in a dedicated and relatively large box form factor.

Such pluggable amplifiers may be configured to optically amplify optical signals transmitted from one switch or router to another switch or router before or after a span of optical fiber that interconnects the two switches/routers to compensate for insertion loss. An optical amplifier placed upstream of the span may be referred to as a booster optical amplifier, while an optical amplifier placed downstream of the span may be referred to as a preamp optical amplifier.

In comparison to such pluggable amplifiers, the communication modules 108 are generally configured to convert outbound electrical signals from a host, such as the switches 102, to outbound optical signals, and to convert inbound optical signals to inbound electrical signals for the host.

Figure 2:
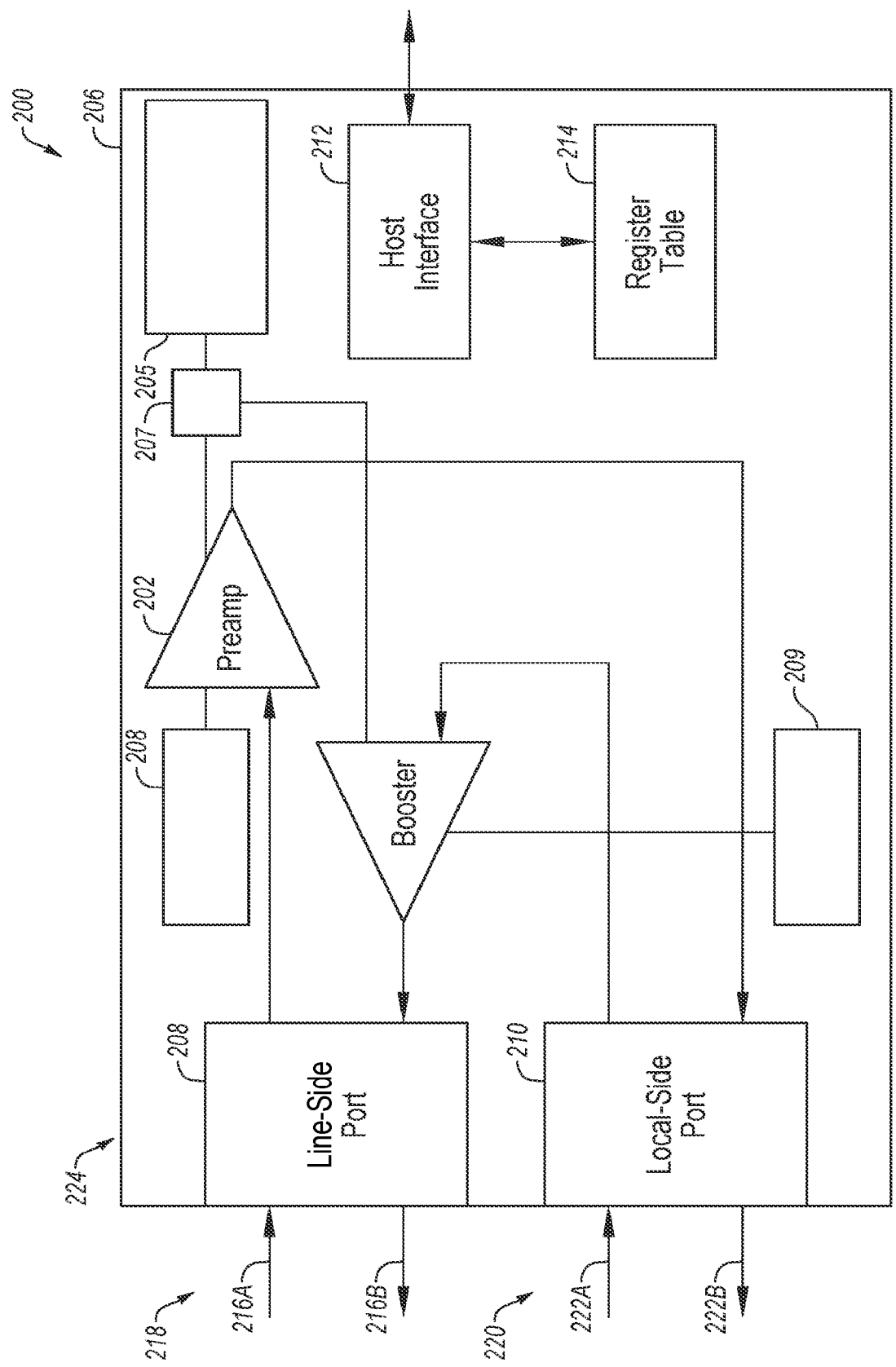
FIG. 2 is a block diagram of an example pluggable bidirectional optical amplifier module that may be implemented in the operating environment of FIG. 1.

FIG. 2 is a block diagram of an example pluggable bidirectional optical amplifier module 200 (hereinafter "pluggable amplifier 200") that may be implemented in the operating environment 100 of FIG. 1, arranged in accordance with at least one embodiment described herein. The pluggable amplifier 200 may generally include a preamp optical amplifier 202 (hereinafter "preamp 202"), a booster optical amplifier 204 (hereinafter "booster 204"), and a housing 206. The preamp 202 and the booster 204 may be doped-fiber amplifiers that have a flat gain spectrum across an operational wavelength range, although other variations are possible. The operational wavelength range may be about 1542 nanometers to 1554 nanometers, although other variations are possible. In one form, a doped-fiber amplifier of the preamp 202 may have a flat gain spectrum across the operational wavelength range when operated at an inversion of at least and a target gain of at least 15 decibels (dB). However, other variations are contemplated. The pluggable amplifier 200 may additionally include a line-side port 208, a local-side port 210, a host interface 212, and a register table 214.

The preamp 202 is configured to amplify optical signals traveling in a first direction through the pluggable amplifier 200. In particular, inbound line-side optical signals 216A from a line side 218 may be optically amplified by the preamp 202 and output to a local side 220 as outbound local-side optical signals 222B.

The booster 204 is configured to amplify optical signals traveling in a second direction through the pluggable amplifier 200. The second direction may be opposite to the first direction. In particular, inbound local-side optical signals 222A from the local side 220 may be optically amplified by the booster 204 and output to the line side 218 as outbound line-side optical signals 216B.

The pluggable amplifier 200 also includes a pump laser 205 which is optically coupled to the preamp 202 and the booster 204. The pump laser 205 is structured to provide a booster power to the booster 204 and a preamp power to the preamp 202. In one form, the preamp power is effective to induce a gain in optical power in the optical signal 216A which provides a target optical power of the optical signal 222B from the preamp 202. In one aspect of this form, the booster power provided to the booster 204 is dependent on the preamp power, and the gain in optical power induced in the optical signal 222A will ultimately depend on the power provided by the pump laser 205 to the preamp 202. Similarly, the optical power of the optical signal 216B will depend on the power provided by the pump laser 205 to the preamp 202. In one form, the booster power may be the same as the preamp power.

In the illustrated form, an optical splitter 207 is positioned between the pump laser 205 and the booster 204 and preamp 202. The optical splitter 207 may be, for example, a 50/50 splitter. In addition, the pluggable amplifier 200 also includes a single power monitor 209 associated with the booster 204. The power monitor 209 may be configured to determine the optical power of the optical signal 222A at an input of the booster 204, the optical power of the optical signal 216B at the output of the booster 204, or both. The determined optical power of the optical signal associated with the booster 204 may be provided to another, remotely spaced pluggable amplifier 200 and the pluggable amplifiers 200 may be configured to exchange network information with one another through a virtual supervisory channel (VSC). The determined optical power of the optical signal associated with the booster 204 may be used to determine the preamp power provided by the pump laser 205 for inducing a gain in the optical power in the optical signal to a achieve a target optical power in the optical signal provided by the preamp 202. The pluggable amplifier 200 may also include a single power monitor 211 associated with the preamp 202. The power monitor 211 may be configured to determine the optical power of the optical signal 216A at an input of the preamp 202, the optical power of the optical signal 222B at the output of the preamp 202, or both.

The pluggable amplifier 200 may also include a pump driver operatively coupled to the pump laser 205. The pump driver may be configured to output an electrical drive signal to drive the pump laser 205, and a modulator may be operatively coupled to the pump driver and configured to output a modulation signal to the pump driver to modulate the electrical drive signal. In one aspect, the modulation signal appears as an envelope on at least one of the optical signal 222B provided by the preamp 202 and the optical signal 216B provided by the booster 204. The amplifier 200 may also include a demodulator which is operatively coupled to the preamp 202, the booster 204, or both, and configured to receive as an input an electrical version of the optical signal and to recover from the electrical version of the optical signal network information superimposed on the optical signal.

The inbound and outbound local-side optical signals 222A, 222B (collectively "local-side optical signals 222) may be exchanged between the pluggable amplifier 200 and one or more local communication modules, e.g., communication modules that are installed in the same switch, router, or other datacenter transmission chassis as the pluggable amplifier 200. In comparison, the inbound and outbound line-side optical signals 216A, 216B (collectively "line-side optical signals 216") may be exchanged between the pluggable amplifier 200 and one or more remote pluggable amplifiers or communication modules, e.g., pluggable amplifiers or communication modules that are installed in a different switch, router, or other datacenter transmission chassis as the pluggable amplifier 20.

The housing 206 is configured to at least partially enclose the preamp 202 and the booster 204. The housing 206, and more generally the pluggable amplifier 200, may have a mechanical form factor that is compliant with a pluggable communication module MSA such as the OSFP MSA or other suitable MSA.

Each of the line-side port 208 and the local-side port 210 may be formed in or by the housing 206 and may be configured to receive a fiber optic connector to optically couple the pluggable amplifier 200 to one or more optical fibers terminated by the fiber optic connector. The line-side port 208 may include a duplex line-side port or two discrete line-side ports. Similarly, the local-side port 210 may include a duplex line-side port or two discrete local-side ports.

The line-side port 208 and the local-side port 210 may be configured to receive fiber optic connectors with the same or different form factors. In an example, the line-side port 208 may include a duplex port configured to receive a duplex LC connector while the local-side port 210 may include a duplex port configured to receive a duplex CS connector.

Although not illustrated in FIG. 2, the pluggable amplifier 200 may include a printed circuit board (PCB) at least partially enclosed within the housing 206 with one or more integrated circuits (ICs) or other components mounted thereon. For example, the preamp 202, the booster 204, pump laser 205 (or one or more components thereof such as a modulator, demodulator, or other components), a controller, the register table 214, the host interface 212, or other components may be mounted to or at least partially included on or in the PCB. The PCB may also include an edge connector to communicatively couple the pluggable amplifier 200 to a host device, such as the switch 102, 104 of FIG. 1.

The host interface 212 may provide a communication interface between the pluggable amplifier 200 and the host device for digital diagnostics and management purposes. The PCB edge connector may be included in the host interface 212. The host interface 212 may include a serial interface common to that used between communication modules (such as the communication modules 108 of FIG. 1) and host devices (such as the switches 102, 104 of FIG. 1). For example, the host interface 212 may include a serial interface commonly used to communicate network and control data, as opposed to customer or payload data, between host devices and communication modules, such as inter-integrated circuit (I2C), management data input/output (MDIO), 1-wire, or other suitable serial interface.

The host interface 212 may be based on or may implement a Common Management Interface Specification (CMIS) Rev 4.0, other version of CMIS, other management interface, or modification(s) thereof. Accordingly, the host interface 212 may support some or all of the functionality of CMIS Rev 4.0 or other management interface. In some embodiments, the management interface upon which the host interface 212 is based may be modified to include a register table, e.g., the register table 214, for ease of deployment. The register table 214 may be directly accessible from the host device through the host interface 212.

The host interface 212 may include a paged module interface, which may be familiar to datacenter administrators already familiar with communication module management. The pluggable amplifier 200 may present through the host interface 212 as a two-lane transceiver or other communication module where one lane represents the line side 218 and the other lane represents the local side 220. The host interface 212 may include a single Module State Machine and a single Data Path State Machine.

The host interface 212 may be as compliant as can be realized given the underlying pluggable amplifier 200 is a dual EDFA as opposed to a communication module such as a transceiver. The pluggable amplifier 200 may advertise one "application" with no pertinent control set parameters through the host interface 212. On boot, the pluggable amplifier 200 may automatically activate this application.

The host interface 212 may support one or more pages of CMIS Rev 4.0. For example, the page(s) supported by the host interface 212 may include one or more of Lower Page (Control and Status Essentials), Upper Page 00h (Administrative Information), Upper Page 01h (Advertising), Upper Page 02h (Module and Lane Thresholds), Upper Page 10h (Lane and Data Path Control), Upper Page 11h (Lane Status), and Upper Page 9Fh (CDB Messaging). "Banking" may be supported by the host interface 212. Upper pages 10h and 11h may implement one bank in the host interface 212, consistent with two lanes. Upper page 9Fh may implement two banks in the host interface 212, consistent with two independent Command Data Block engines.

The host device may detect the presence of the pluggable amplifier 200 using the same methods as it does communication modules. The host device may retrieve monitor values and sense alarms as it does for communication modules. The host device need not issue commands to start up the pluggable amplifier 200. Instead, it may simply raise the ResetL digital input and the LPMode digital input. Raising the ResetL digital input may allow the pluggable amplifier 200 to come out of reset. Raising the LPMode digital input may allow the pluggable amplifier 200 to transition to full power.

The host interface 212 may include some custom interface aspects, implemented in a compliant way. For example, the CMIS Rev 4.0 specification assumes that all lanes are symmetric and only provides for a single set of alarm thresholds for optical receive (RX) and transmit (TX) powers. Some embodiments of the host interface 212 described herein include a second set of "alternate" thresholds because the two lanes, e.g., EDFAs included in each of the booster 204 and the preamp may not be symmetric.

Figure 3A:
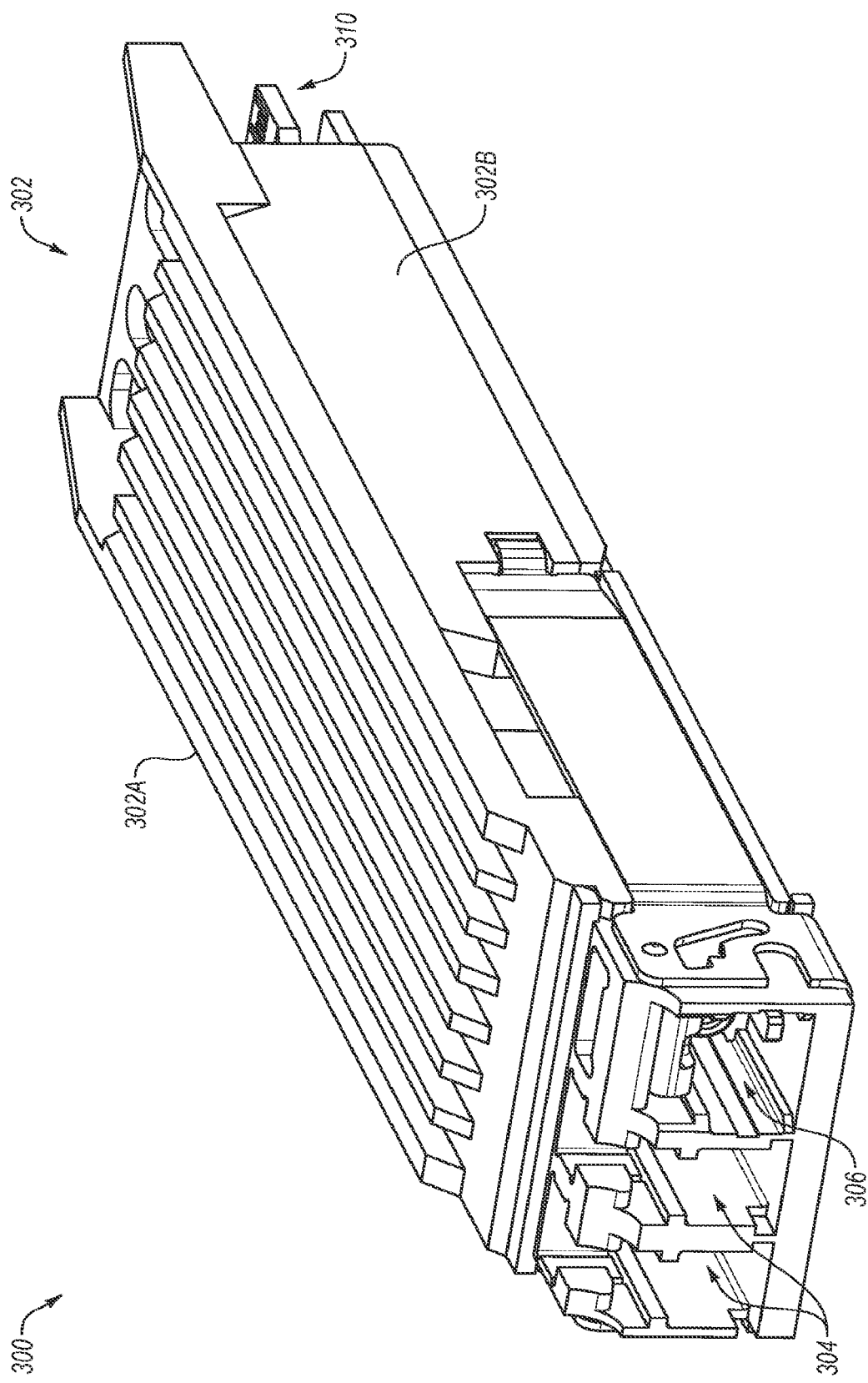
FIGS. 3A-3C include two perspective views and an end view of an example pluggable bidirectional optical amplifier module that may be implemented in the operating environment of FIG. 1.
Figure 3B:
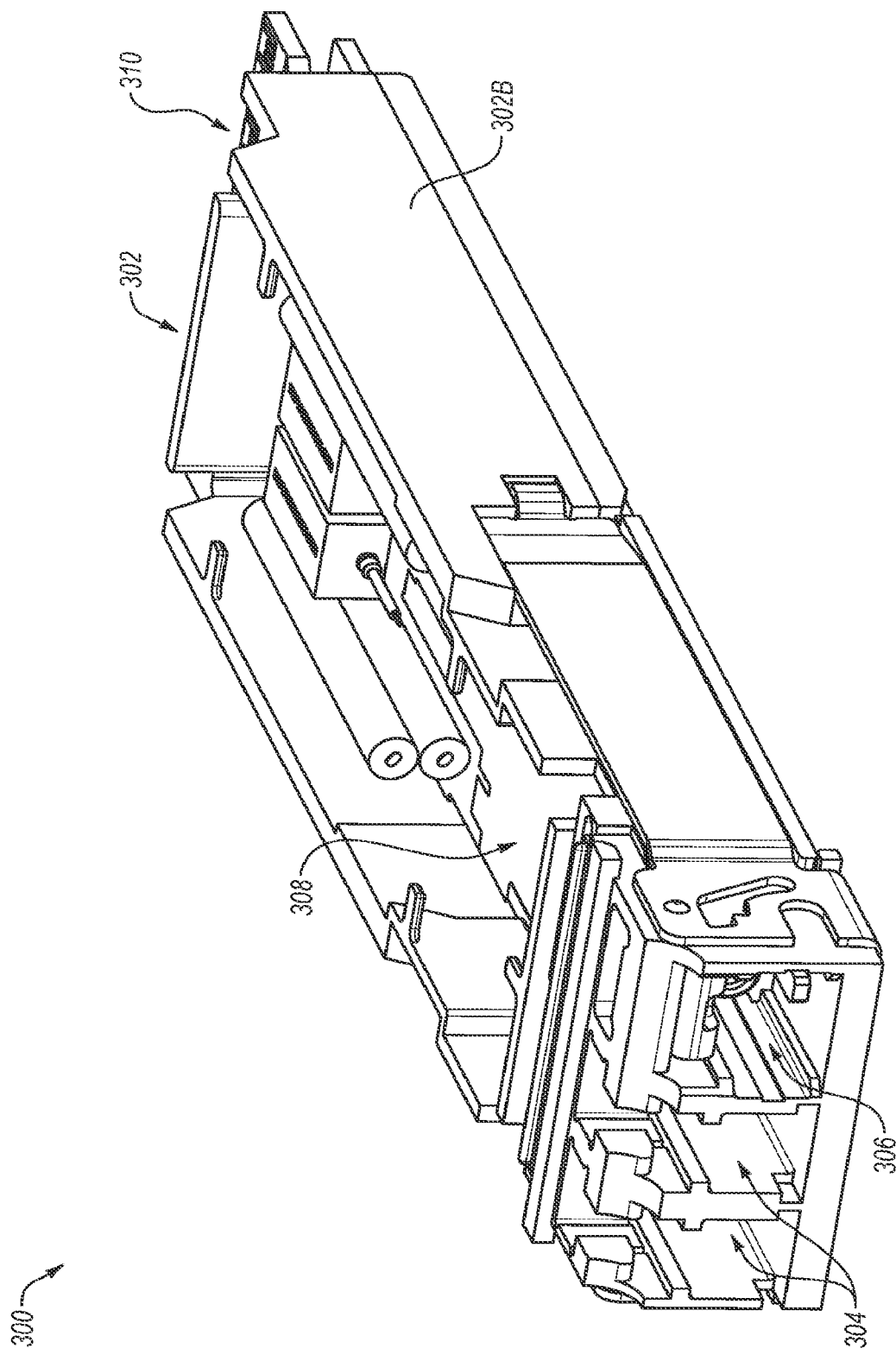
Figure 3C:
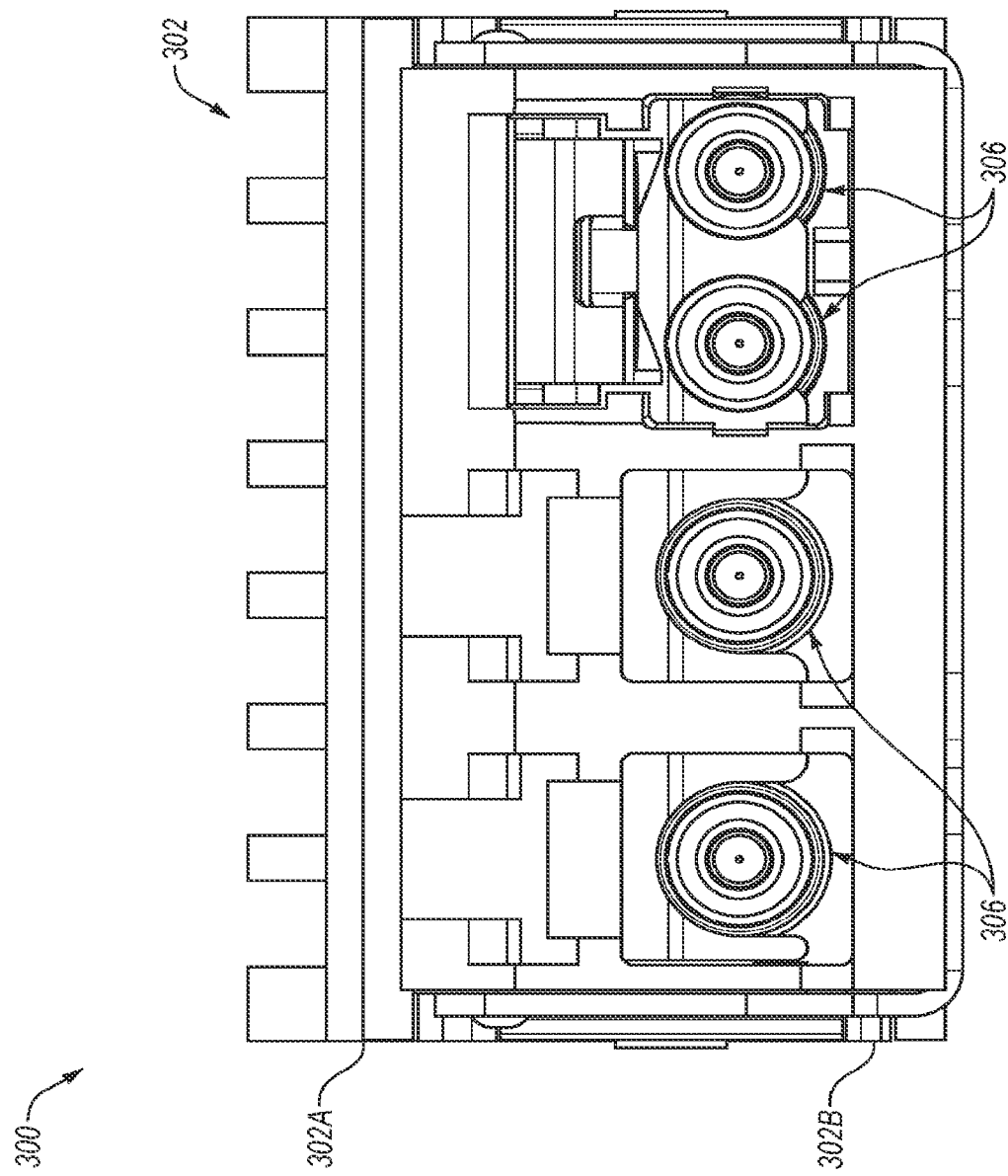

FIGS. 3A-3C include two perspective views and an end view of an example pluggable bidirectional optical amplifier module 300 (hereinafter "pluggable amplifier 300") that may be implemented in the operating environment 100 of FIG. 1, arranged in accordance with at least one embodiment described herein. The pluggable amplifier 300 may include or correspond to the pluggable amplifier 200 of FIG. 2.

For example, as illustrated, the pluggable amplifier 300 includes a housing 302 with line-side and local-side ports 304, 306 that may include or correspond to the housing 206 with the line-side and local-side ports 208, 210 of FIG. 2. The pluggable amplifier 300 additionally includes a PCB 308 with edge connector 310 that may include or correspond to the PCB and edge connector discussed with respect to FIG. 2.

The housing 302 includes a top shell 302A (omitted from FIG. 3B) and a bottom shell 302B that cooperate to at least partially enclose one or more components inside the housing 302, such as the PCB 308, preamp and booster optical amplifiers, and other components. The line-side port 304 may include a duplex port configured to receive a duplex LC connector while the local-side port 306 may include a duplex port configured to receive a duplex CS connector.

Figure 4:
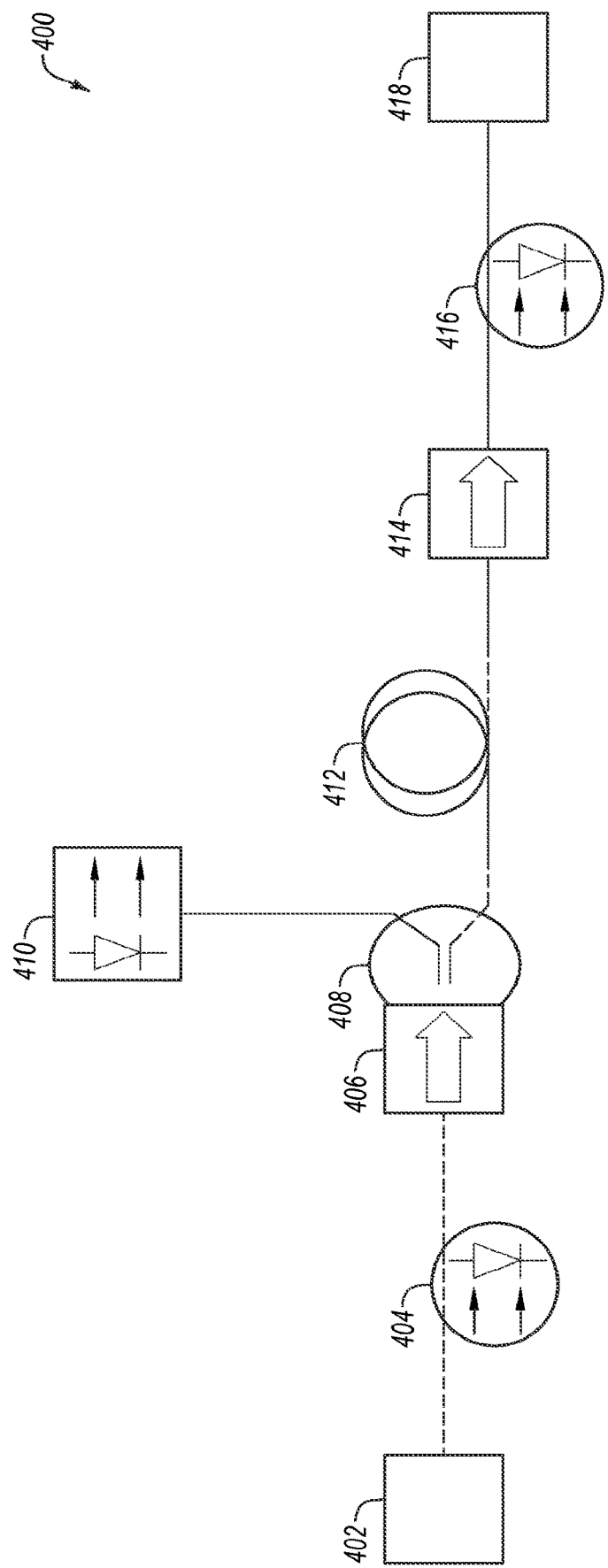
FIG. 4 illustrates an example optical amplifier that may be implemented in the pluggable bidirectional optical amplifier module of FIGS. 2-3C.

FIG. 4 illustrates an example optical amplifier 400 that may be implemented in the pluggable amplifier 200, 300 of FIGS. 2-3C, arranged in accordance with at least one embodiment described herein. The optical amplifier 400 may include or correspond to the preamp 202 or the booster 204 of FIG. 2 or other preamp or booster optical amplifiers described herein, provided that the pump laser 410 described below is shared between the preamp 202 and the booster 204.

The optical amplifier 400 may include an input 402, an input optical splitter and photodiode 404, an input optical isolator 406 (hereinafter "input isolator 406"), an optical combiner 408, a pump laser 410, a doped-fiber amplifier 412, an output optical isolator 414 (hereinafter "output isolator 414"), an output optical splitter and photodiode 416 (or in some forms an optical combiner), and an output 418. The optical amplifier 400 may be configured to operate in the C-band, the L-band, or both the C-band and the L-band.

An input optical splitter of the input optical splitter and photodiode 404 may receive an optical signal (e.g., an input signal) from the input 402. The input optical splitter may split and provide the input signal to an input photodiode of the input optical splitter and photodiode 404 and to the optical combiner 408 through the input isolator 406. The input optical splitter may equally or unequally divide the optical power level of the input signal between optical paths to, respectively, the input photodiode and the optical combiner 408 such that the input photodiode and the optical combiner 408 may receive the input signal at divided optical power levels.

The input photodiode of the input optical splitter and photodiode 404 may generate an electrical signal from which supervisory message data included in an envelope of the optical signal may be demodulated. Input power of the optical signal may alternatively or additionally be determined from the electrical signal generated by the input photodiode. The determined input power may be used in a gain control algorithm of the optical amplifier 400 generally in both feedforward and for input level for feedback. Alternatively or additionally, the determined input power may be used as an input in determining and setting gain of the optical amplifier 400 when coupled with information received in the supervisory message data with regard to launch power from an opposite end of a fiber span coupled to the input 402. When used for feed forward control of the pump laser 410, the electrical signal generated by the input photodiode may be referred to as an electrical feed forward control signal. An electrical drive signal applied to the pump laser 410 may be at least partially determined based on the feed forward control signal. The drive signal of the pump laser 410 may alternatively or additionally be determined based on an electrical feedback control signal generated by an output photodiode of the output optical splitter and photodiode 416. The drive signal may determine an optical gain of the optical amplifier 400.

The pump laser 410 may receive the drive signal from a pump driver (not shown in FIG. 4) and may generate a laser signal based on the drive signal. In some embodiments, the pump laser 410 may generate the laser signal as an optical signal representative of the drive signal. In these and other embodiments, the optical power level of the laser signal may be based on a current level of the drive signal.

The optical combiner 408 may receive, through the input isolator 406, the input signal at the divided optical power level from the input optical splitter of the input optical splitter and photodiode 404. In addition, the optical combiner 408 may receive the laser signal, which may also be referred to as the pump power which activates the gain medium, from the pump laser 410. The optical combiner 408 may combine the input signal and the laser signal into a combined signal provided to the doped-fiber amplifier 412. In some embodiments, the optical power level of the combined signal may be equal to a sum of the optical power levels of the input signal and the laser signal received by the first optical combiner 408. In other embodiments, the optical power level of the combined signal may be greater than the optical power level of the input signal or the laser signal individually but less than the sum of these optical power levels.

The doped-fiber amplifier 412 may receive the combined signal from the optical combiner 408. The doped-fiber amplifier 412 may generate an output signal as an optical signal based on the combined signal. In some embodiments, the doped-fiber amplifier 412 may be configured to apply a gain to the combined signal such that the output signal is generated as an amplified version of the combined signal. In these and other embodiments, the combined signal may drive the doped-fiber amplifier 412.

An output optical splitter of the output optical splitter and photodiode 416 may receive the output signal from the doped-fiber amplifier 412, e.g., via the output isolator 414, and split it in two. In particular, the output optical splitter may divide the optical power level of the output signal between the output 418 and the output photodiode of the output optical splitter and photodiode 416. In these and other embodiments, the output optical splitter may equally or unequally divide the optical power level of the output signal.

The output photodiode of the output optical splitter and photodiode 416 may generate an electrical feedback control signal to implement feedback control of the pump laser 410 based upon which the drive signal applied to the pump laser 410 may be at least partially determined. As previously discussed, the drive signal of the pump laser 410 may be determined based on both the feed forward control signal and the feedback control signal.

With combined reference to FIGS. 2 and 4, each of the preamp 202 and the booster 204 may include the same or similar or other configuration as the optical amplifier of 400 of FIG. 4. In some embodiments, the preamp 202 and the booster 204, whether implemented as two instances of the optical amplifier 400 or in some other configuration, may accommodate variable span loss from 0 to 20 decibels (dB) and may support the data associated with eight channels, e.g., communication modules at each end of the span. As described in more detail below, the eight channels may be limited to a relatively narrow operational wavelength (or channel) range within the C-band or L-band and the operational wavelength range may have a relatively flat gain spectrum.

Typical multi-channel optical amplifiers are designed to work for a full band, such as the full C-band or full L-band. To support a full band and a high optical gain, a gain flattening filter (GFF) is typically required to reduce the wavelength (or channel)-dependent gain variation fundamental to the doped-fiber amplifier within each of the preamp and the booster. To keep gain ripple low over a variable gain, a variable optical attenuator (VOA) is typically needed. The GFF, VOA, or other components may be placed before, between or after one or more gain coils of each doped-fiber amplifier. Placing these components before the gain coil may increase a noise figure (NF) and decrease OSNR. Placing these components between the gain coils may require that there be at least 2 gain coils (and all the associated components). Placing these components after the gain coils may require higher pump power to reach the same output power. Inclusion of these components in an amplifier module increases costs of the amplifier module and may exceed available space of a desired package. For example, it may be difficult or impossible to fit all of the foregoing components in a pluggable bidirectional optical amplifier module that has a mechanical form factor that is compliant with the OSFP MSA.

Accordingly, in some embodiments, each of the optical amplifiers 400 implemented herein, such as the preamp 202 and the booster 204, may have an operational wavelength range that is a subset of the C-Band or the L-B and that has a relatively flat gain spectrum. The flat gain spectrum has reduced tilt or ripple within the operational wavelength range compared to non-flat gain spectra. Ripple of the gain spectrum within the operational wavelength range may be defined as a difference at a given target gain between a maximum wavelength-dependent gain within the operational wavelength range and a minimum wavelength-dependent gain within the operational wavelength range. The flat gain spectrum may have reduced rippled such that no GFF is needed. In comparison, tilt of the gain spectrum within the operational wavelength range may be defined as a difference at a given target gain between a maximum wavelength-dependent gain within the operational wavelength range and a minimum wavelength-dependent gain within the operational wavelength range of a linear fit to the gain spectrum.

The flat gain spectrum may be obtained by operating the doped-fiber amplifier 412 at an appropriate inversion. In some embodiments, the appropriate inversion is an inversion that is higher than that usually applied to a doped-fiber amplifier when not trying to impart a flat gain spectrum to the doped-fiber amplifier. The inversion of the doped-fiber amplifier 412 may depend on the optical power level of the combined signal received from the optical combiner 408. Accordingly, the inversion of the doped-fiber amplifier 412 may be controlled by the drive signal applied to the pump laser 410.

In some embodiments, the flat gain spectrum may have reduced temperature-dependent gain within the operational wavelength range compared to non-flat gain spectra.

Because the tilt is reduced within the operational wavelength range compared to non-flat gain spectra, the VOA may be omitted. The absence of the VOA may improve optical performance, e.g., OSNR, of the optical amplifier 400 compared to an optical amplifier with a VOA as it eliminates passive loss from the VOA and associated taps and the intended attenuation that the VOA provides to keep the gain flat. The OSNR of the optical amplifier 400 may thereby be dramatically improved at least at low gain.

In some embodiments, the booster 204 may be or operate as a fixed gain amplifier and the preamp 202 may be or operate as a variable gain amplifier. Because of the simplicity of the design of the doped-fiber amplifier with flat gain that may be implemented in each of the booster 204 and the preamp 202 according to some embodiments, there is no actual difference between the two in some embodiments such that either or both of the booster 204 and the preamp 202 may be operated as a variable gain amplifier.

In addition, boosters and preamps in different pluggable amplifiers, e.g., at opposite ends of a span, may communicate with each other and exchange network information through a VSC as described elsewhere herein. Accordingly, overall link performance may be optimized. For example, gain at each of the booster and preamp at opposite ends of the span may be set to reduce electrical power consumption, e.g., in low span loss cases. In this example, the booster may operate at a lower gain and thus lower output power. Overall ripple and gain shape of a link made up of the booster and preamp at opposite ends of the span may be independent of how the gain is distributed between them.

In some embodiments, the relatively narrow operational wavelength range of the doped-fiber amplifier 412 may coincide with a region of a gain spectrum of the doped-fiber amplifier that is relatively flat to eliminate the need for a GFF. Alternatively or additionally, the operational wavelength range may coincide with minimum effect from temperature-dependent spectral gain change to eliminate the need for a coil heater or other temperature control. Over the operational wavelength range, the tilt associated with the target gain may be small enough that for a link that includes a booster and preamp at opposite ends of a span, the ripple associated with 20 dB gain is tolerable. This may be accomplished by pre-biasing the tilt negatively at the highest gain so that the lowest gain is approximately the same in the positive direction.

Further details of the foregoing operational aspects of the amplifier 400, as well as the relatively narrow operational wavelength (or channel) range within the C-band or L-band and the operational wavelength range having a relatively flat gain spectrum in which the amplifiers described herein may be used may be found in U.S. patent application Ser. No. 16/812,186 filed on Mar. 6, 2020. The contents of this application are incorporated herein by reference in their entirety.

Figure 5:
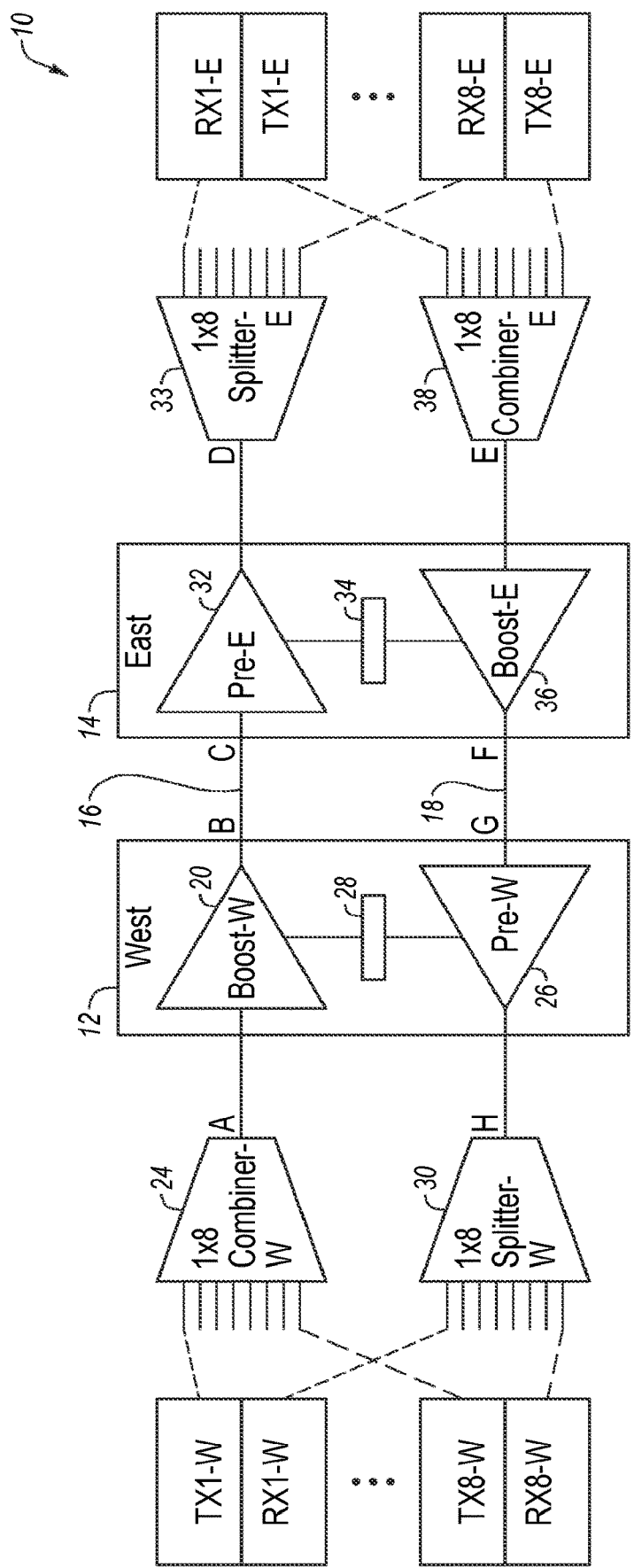
FIG. 5 is a block diagram of a portion of an optical network including a pair of optical amplifier modules.

FIG. 5 is a high level diagram of a portion of an optical communication network 10, in particular illustrating a pair of optical amplifier nodes 12, 14 formed in accordance with the present invention to utilize pump modulation for bidirectional signaling of supervisory message data (as well as, perhaps, other non-customer network management commands and messages) between the amplifier nodes. The amplifier nodes 12, 14 of FIG. 5 may be implemented in pluggable form and may therefore include or correspond to, e.g., the pluggable amplifiers 200, 300 of FIGS. 2-3C and may be referred to individually as the first node 12 or the second node 14.

In FIG. 5, a first optical fiber 16 is used to support the "west-to-east" transmission of optical signals from the first node 12 to the second node 14, and a second optical fiber 18 is used to support the "east-to-west" transmission of optical signals from the second node 14 to the first node 12. The term "bidirectional" as applied to supervisory messages as described herein refers to the establishment of signal paths for supervisory messages to travel in each direction between a given pair of amplifier nodes. These bidirectional supervisory messages may propagate along (unidirectional) optical fibers 16 and 18; the combination of optical fibers 16 and 18 thus forming the bidirectional link for the transmission of supervisory messages between a pair of adjacent amplifier nodes.

As with the conventional operation of an amplifier node as discussed above, customer signals that enter the first node 12 are passed through an optical booster amplifier 20 to boost the power in these signals before being coupled into the optical fiber 16 and transmitted along to the second node 14. The optical amplifier 20 may include or correspond to the booster optical amplifiers described elsewhere herein and may be in the form of a doped-fiber amplifier, including a section of rare-earth doped gain fiber for example. Also shown in this view is a pump source 22 (e.g., a laser diode that operates at a known pump wavelength, such as 980 nm for Er-doped fiber) that is optically coupled to the optical amplifier 20. A pump driver (not shown) may be used to provide an input drive signal to the pump source 22 and energize the pump source 22. An optical combiner 24 may receive and combine the incoming optical signals, and their combination along with the pump light may be provided as the input to the optical booster amplifier 20, where the presence of the pump light results in amplification (increasing the power level) of the customer signals. The first node 12 also includes a preamp optical amplifier 26 which is also optically coupled to the pump source 22. The preamp optical amplifier 26 may include or correspond to the booster optical amplifiers described elsewhere herein and may be in the form of a doped-fiber amplifier, including a section of rare-earth doped gain fiber for example. An optical splitter 30 may split the optical signal which exits from the preamp optical amplifier 26.

An amplified optical signal provided by the first node 12 may propagate along the optical fiber 16 and be received by the second node 14. The second node 14 includes an optical preamp amplifier 32 to boost the power in these signals before exiting the preamp amplifier 32. An optical splitter 33 may split the optical signal which exits from the preamp optical amplifier 32. The preamp optical amplifier 32 may include or correspond to the booster optical amplifiers described elsewhere herein and may be in the form of a doped-fiber amplifier, including a section of rare-earth doped gain fiber for example. Also shown in this view is a pump source 34 (e.g., a laser diode that operates at a known pump wavelength, such as 980 nm for Er-doped fiber) that is optically coupled to the optical amplifier 32. A pump driver (not shown) may be used to provide an input drive signal to the pump source 34 and energize the pump source 34. The second node 14 also includes a booster optical amplifier 36 which is also optically coupled to the pump source 34. The booster optical amplifier 36 may include or correspond to the booster optical amplifiers described elsewhere herein and may be in the form of a doped-fiber amplifier, including a section of rare-earth doped gain fiber for example. An optical combiner 38 may receive and combine the incoming optical signals, and their combination along with the pump light may be provided as the input to the optical booster amplifier 36, where the presence of the pump light results in amplification (increasing the power level) of the customer signals. An amplified optical signal provided by the second node 14 may propagate along the optical fiber 18 and be received by the first node 12.

As indicated above, the booster optical amplifier 20 and the preamp optical amplifier 26 in the first node 12 share a common pump source 28, and the preamp optical amplifier 32 and the booster optical amplifier 36 in the second node 14 share a common pump source 34. As illustrated in FIG. 5 for example, an optical signal may have different strengths at various different locations A, B, C, D, E, F, G and H in the optical communication network 10. Regarding the second node 14 for example, an optical signal may have a target optical power at location D for example. The power of the optical signal received by the booster amplifier 20 at the location A may be communicated to the preamp optical amplifier 32, and the amount of power provided by the preamp optical amplifier 32 to induce a gain in optical power of the optical signal to provide a target optical power at the location D may be determined based on the information provided by the booster amplifier 20. Similarly, in this configuration, the preamp optical amplifier 32 or the pump source 34 may target an appropriate output power so that the gain of the booster amplifier the span between the first node 12 and the second node 14, and the preamp amplifier 32 achieves the target optical power at the location D. Since the booster amplifier 36 at the second node 14 is also optically coupled to the pump source 34, the power provided to the booster amplifier 36 is dependent on the power provided to the preamp amplifier 32. If a 50/50 splitter is positioned between the pump source 34 and the booster amplifier 36 and the preamp amplifier 32 for example, then the power provided to the booster amplifier 36 and the preamp amplifier 32 is the same. The gain induced in the power of an optical signal by the booster amplifier 36 between the locations E and F, for example, will be whatever it turns out to be dependent on the power provided by the pump source 34 to achieve the target optical power of the optical signal at the location D.

Regarding the first node 12 for example, an optical signal may have a target optical power at location H for example. The power of the optical signal received by the booster amplifier 36 may be communicated to the preamp optical amplifier 26, and the amount of power provided by the preamp optical amplifier 26 to induce a gain in optical power of the optical signal to provide a target optical power at the location H may be determined based on the information provided by the booster amplifier 36. Similarly, in this configuration, the preamp optical amplifier 26 or the pump source 28 may target an appropriate output power so that the gain of the booster amplifier 36, the span between the second node 14 and the first node 12, and the preamp amplifier 26 achieves the target optical power at the location H. Since the booster amplifier 20 at the first node 12 is also optically coupled to the pump source 28, the power provided to the booster amplifier 20 is dependent on the power provided to the preamp amplifier 26. If a 50/50 splitter is positioned between the pump source 28 and the booster amplifier 20 and the preamp amplifier 26 for example, then the power provided to the booster amplifier 20 and the preamp amplifier 26 is the same. The gain induced in the power of an optical signal by the booster amplifier 20 between the locations A and B, for example, will be whatever it turns out to be dependent on the power provided by the pump source 28 to achieve the target optical power of the optical signal at the location H.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical amplifier module, comprising:
   a booster optical amplifier configured to increase optical power of a first optical signal;
   a preamp optical amplifier configured to increase optical power of a second optical signal; and
   a pump laser optically coupled to the booster optical amplifier and the preamp optical amplifier;
   wherein a pump laser output is optically split to provide a first portion to the booster optical amplifier and a second portion to the preamp optical amplifier.

2. The optical amplifier module of claim 1, wherein the first portion has a first power, the second portion has as second power, and the first portion is equal to the second portion.

3. The optical amplifier module of claim 1, further comprising a splitter optically positioned between the pump laser output and each of the preamp optical amplifier and the booster optical amplifier.

4. The optical amplifier module of claim 1, further comprising a power monitor associated with the booster optical amplifier and configured to determine an optical power of the first optical signal at an input of the booster optical amplifier.

5. The optical amplifier module of claim 4, further comprising a power monitor associated with the preamp optical amplifier and configured to determine an optical power of the second optical signal at an output of the preamp optical amplifier.

6. The optical amplifier module of claim 1, wherein each of the preamp and booster optical amplifiers comprises a doped-fiber amplifier.

7. The optical amplifier module of claim 6, wherein the doped-fiber amplifier has a flat gain spectrum across an operation wavelength range and the operational wavelength range comprises the wavelength range from 1542 nanometers to 1554 nanometers.

8. The optical amplifier module of claim 6, wherein the doped-fiber amplifier of the preamp optical amplifier has a flat gain spectrum across an operational wavelength range when operated at an inversion of at least 0.7 and a target gain of at least 15 decibels (dB).

9. The optical amplifier module of claim 1, wherein:
   wherein the pump laser is configured to provide a power output to increase optical power of the first optical signal and the second optical signal, the preamp optical amplifier is configured to receive, from the power output, a first amount of power effective to induce a gain in optical power to provide a targeted optical power of the second optical signal from the preamp optical amplifier, and the booster optical amplifier is configured to receive, from the power output, a second amount of power corresponding to a difference between the power output and the first amount of power.

10. The optical amplifier module of claim 9, further comprising a single power monitor associated with the booster optical amplifier and configured to determine optical power of the first optical signal at an input of the booster optical amplifier.

11. The optical amplifier module of claim 10, further comprising a single power monitor associated with the preamp optical amplifier and configured to determine optical power of the second optical signal at an output of the preamp optical amplifier.

12. The optical amplifier module of claim 9, wherein the first amount of power is equal to the second amount of power.

13. The optical amplifier module of claim 9, wherein the module is configured to exchange network information with another optical amplifier module through a virtual supervisory channel (VSC).

14. The optical amplifier module of claim 9, further comprising:
- a pump driver operatively coupled to the pump laser and configured to output an electrical drive signal to drive the pump laser; and
- a modulator operatively coupled to the pump driver and configured to output a modulation signal to the pump driver to modulate the electrical drive signal;
- wherein the modulation signal appears as an envelope on at least one of the first optical signal after it passes through the booster optical amplifier and the second optical signal after it passes through the preamp optical amplifier.

15. The optical amplifier module of claim 9, wherein at least one of the preamp optical amplifier or the booster optical amplifier comprises:
- a fiber-based optical amplifier configured to receive an optical signal that has network information superimposed thereon; and
- a demodulator operatively coupled to the fiber-based optical amplifier and configured to receive as an input an electrical version of the optical signal and to recover from the electrical version of the optical signal the network information superimposed on the optical signal.

16. The optical amplifier module of claim 9, further comprising a housing and a host interface at least partially enclosed within the housing, the host interface configured to communicatively couple the module to a host device.

* * * * *